United States Patent [19]

Marcus et al.

[11] 3,900,432

[45] Aug. 19, 1975

[54] VARISTOR COMPOSITIONS

[75] Inventors: Sanford Morton Marcus; Frank Knowles Patterson, both of Wilmington, Del.

[73] Assignee: E. I. Du Pont de Nemours and Company, Wilmington, Del.

[22] Filed: Oct. 15, 1973

[21] Appl. No.: 406,302

[52] U.S. Cl. ................ 252/519; 252/518; 252/520; 117/221

[51] Int. Cl. ............................................. H01b 1/06

[58] Field of Search.................... 252/518, 519, 520; 117/221

[56] References Cited

UNITED STATES PATENTS 2,590,893 4/1952 Sanborn ............................. 252/520

3,515,686 6/1970 Bowman ............................ 252/512

3,560,410 2/1971 Schubert ............................ 252/518

FOREIGN PATENTS OR APPLICATIONS 48-27,555 8/1973 Japan

*Primary Examiner*—Maynard R. Wilbur
*Assistant Examiner*—S. C. Buczinski

[57] ABSTRACT

Compositions, for producing thick film varistors on dielectric substrates, of inorganic powders dispersed in an inert liquid vehicle. The inorganic powders comprise doped iron oxides of the formula $Fe_{2-x}M_xO_3$, wherein M is Ge or Ti and $x$ is 0.0001–0.05, plus certain glass powders. Also the resultant thick film varistors.

30 Claims, No Drawings

VARISTOR COMPOSITIONS

BACKGROUND OF THE INVENTION

This invention relates to electronic compositions, and more particularly, to varistor compositions.

A varistor may be described primarily as a voltage sensitive resistor wherein, at a given temperature, current is a nonlinear function of the applied potential. In addition to the above definition, in this work the following functional definition of a varistor has been used often. In determining whether varistor, as opposed to thermistor, action is present, an I/V (current/voltage) trace is taken on an oscilloscope, such that the entire current (I) excursion occupies the full vertical axis of the screen. When the I/V trace is asymptotic to the origin (that is, the point at which the I and V axes coincide) the sample is considered to be a varistor, and from experience generally had an $n$ two or greater ($n$ being the measure of nonlinearity between I and V, as defined below). When it is said herein that varistor action was or was not observed, it is the above observation that is referred to.

Varistors are presently used in discrete component form, and must be attached to circuit boards, for example, by soldering. Substantial savings in labor and cost, as well as the ability to miniaturize circuits, would be possible if practical screen-printed thick-film varistors were available. Thick-film technology, of course, involves printing passive (conductors, dielectrics) and active (switches, thermistors) functions on a dielectric substrate (such as alumina); after a paste of inorganic materials in a vehicle (polymer plus liquid solvent) has been printed on the substrate the printed substrate is fired (sintered or matured) to remove the vehicle and form electrically continuous functions.

Sanborn U.S. Pat. No. 2,590,894, issued Apr. 1, 1952, describes the use of the thermal reaction product of $Fe_2O_3$ and $TiO_2$ (e.g., 97.5%/2.5%, by weight) in making bulk sintered objects useful as electrically conducting ceramic bodies. When $Fe_{2-x}Ge_xO_3$ or $Fe_{2-x}Ti_xO_3$ is fired as a thick film in the absence of glass, thermistor behavior, not varistor behavior, is observed.

SUMMARY OF THE INVENTION

We have invented a composition useful for printing a film on a dielectric substrate and firing the same to form film varistors, said composition being of finely divided inorganic material dispersed in an inert liquid vehicle; said inorganic material comprising, by weight, a. 60–99% of a crystalline semiconductive oxide of the formula $Fe_{2-x}M_xO_3$, wherein M is one or more of Ge and Ti and x is in the range 0.0001–0.05, and b. 1–40% of a glass powder comprising one or more of at least 10% PbO, at least 10% $Be_2O_3$ and at least 25% CdO.

Preferred compositions comprise 70–95% semiconductive oxide (a) and 5–30% glass (b), and optimum compositions 80–95% (a) and 5–20% (b). The compositions may optionally contain unreacted (free) $GeO_2$ and/or $TiO_2$, not in the form of its reaction produce with $Fe_2O_3$, the semiconductive oxide $Fe_{2-x}M_xO_3$. The amount of the free oxide present is such that there is no more than 10%, preferably no more than 5%, of $GeO_2$ and/or $TiO_2$ present as either the semiconductive oxide or a free oxide, the percentage being based upon the total semiconductive oxide and the free oxide ($GeO_2$ and/or $TiO_2$) present.

Preferably, glass powder (b) comprises at least 40% PbO, at least 40% $Bi_2O_3$ or at least 40% CdO, or at least 40% of a combination thereof.

Also a part of this invention are printed thick film varistors on a dielectric substrate, of the inorganic material of the above dispersions. The inorganic material is, of course, sintered (cured or fired) to form a coherent (coalesced) element adherent to the dielectric substrate.

DETAILED DESCRIPTION

The inorganic materials in the compositions of the present invention must be finely divided, that is, they must be sufficiently finely divided to be used in conventional screen-printing operations to produce thick films on substrates. Typically, such materials are sufficiently finely divided to pass through a 325 mesh screen, preferably a 400 mesh screen. More preferred particle sizes for all the inorganic particles (glass, doped iron oxide, and any excess unreacted $GeO_2$ and/or $TiO_2$) are less than 1 micron average particle size. Optimum particle sizes for the doped iron oxide is an average of about 0.8 microns and for glass about 0.2 microns.

The operative proportions of semiconductive oxide to glass are 60–99% semiconductive oxide and 1–40% glass. At least 1% glass is present to provide some adhesion of the fired varistor to the substrate; at least 60% semiconductive oxide is present to achieve a useful level of conductivity and varistor behavior. Preferred proportions are 70–95% semiconductive oxide and 5–30% glass, at least 5% to provide better adhesion to the substrate. Optimum proportions are 80–95% semiconductive oxide and 5–20% glass.

The glass necessarily comprises PbO, $Bi_2O_3$ and/or CdO, in the stated proportions. The glass is formed by conventional glass-making techniques, e.g., heating the component oxides or equivalent amounts of precursors thereof (e.g., $H_3BO_3$ for $B_2O_3$, $CaCO_3$ for CaO, $Al(OH)_3$ for $Al_2O_3$, etc.) to form a homogeneous melt, and then quenching the melt by pouring into water or onto a cold roll to form powder or flake glass particles; the resultant glass particles are milled by conventional means to the desired particle size. At least 10% PbO, or at least 10% $Bi_2O_3$, or at least 25% CdO, based on the total composition of the glass, are present in the glass to obtain varistor behavior in the resultant fired varistor. The remainder of the glass may be any of the conventional glass-forming oxides such as $K_2O$, $SiO_2$, $Al_2O_3$, $Na_2O$, $TiO_2$, $Li_2O$, $Sb_2O_3$, etc., or glass forming compounds such as $PbF_2$. It is preferred that there be at least 40% PbO, $Bi_2O_3$ and/or CdO in the glass for enhanced varistor behavior. As used herein, the term "glass" includes the situation where the glass is 100% $Bi_2O_3$. In the case of PbO at least 3% of other glass-forming oxides are present to form practical useful glasses, and in the case of CdO at least 10% other oxides.

The preparation of the compounds $Fe_{2-x}Ti_xO_3$ by heating the component oxides ($Fe_2O_3$ and $TiO_2$) at elevated temperature (e.g., 1260°C.) is disclosed in Sanborn U.S. Pat. No. 2,590,894, issued Apr. 1, 1952. In the present work it has been prepared by heating at 1200°C. for 10–14 hours an aqueous slurry of the reactants. The compounds $Fe_{2-x}Ge_xO_3$ may be similarly prepared by heating at temperatures as low as 950°C. Typically, the respective oxides are heated in the desired relative proportions at 1000°–1200°C. for 10–48 hours.

An essential feature of the present invention is the presence of the semiconductive oxides $Fe_{2-x}M_xO_3$ (where M is Ge or Ti) in the paste compositions. It is thought that the maximum amount of dopant ($TiO_2$ or $GeO_2$) which can be inserted into the hexagonal alpha-$Fe_2O_3$ crystal lattice corresponds to $x$ equal to 0.05.

The crystalline structure of the semiconductive oxides which are essential to the present invention was examined as follows. Incorporation of $GeO_2$ into the hexagonal alpha-$Fe_2O_3$ lattice by high temperature solid state synthesis techniques can be rationalized by the following molar equation:

$$1 - \frac{x}{2} Fe_2O_3 + x\,GeO_2 \xrightarrow{\text{heat}} Fe_{2-x}Ge_xO_3 + \frac{x}{4} O_2$$

Every $Ge^{+4}$ ion incorporated into the lattice network creates an $Fe^{+2}$ to achieve electrical neutrality. This can be demonstrated by the following relationship: $Fe_{2-x}{}^{+3}Fe_{x/2}{}^{+2}Ge_{x/2}{}^{+4}O_3$ The condition for electrical conductivity in semiconductors of this type is that the lattice network contain ions of different valency on the same crystallographic sites. That $Ge^{+4}$ does substitute on the octahedral sites of the hexagonal alpha-$Fe_2O_3$ lattice, maintaining the same symmetry, is shown by x-ray powder diffraction on $Fe_2O_3$ containing 3.24% $GeO_2$ fired at 1100°C. for 48 hours. A Hägg Gunier camera using $CuK\alpha_1$ radiation was used. The powder pattern was indexed on the basis of the hexagonal alpha-$Fe_2O_3$ lattice. All reflections could be accounted for. No $GeO_2$ reflections were noted. The lattice parameters were refined by least squares techniques. The unit cell parameters (in Angstroms) of this compound are shown below and compared with the cell parameters of alpha-$Fe_2O_3$ reported under ASTM Card No. 13–534:

| | a° | c° |
|---|---|---|
| alpha-$Fe_2O_3$ | 5.0353 | 13.750 |
| $Fe_2O_3$ + 3.24% $GeO_2$ | 5.0317 | 13.737 |

Thick film printed varistors are prepared by applying (using conventional screen or stencil printing techniques) the paste compositions of the present invention to a dielectric substrate. Generally the paste is used according to general thick-film principles as set forth in the Handbook of Materials and Processes for Electronics, C.A. Harper, ed., McGraw-Hill, N.Y., 1970, Chapter 12. The pastes or printing compositions are prepared from the solids and vehicles by mechanical mixing. Any inert liquid may be used as the vehicle. Water or any one of various organic liquids, with or without thickening and/or stabilizing agenst and/or other common additives, may be used as the vehicle. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols or solutions of ethyl cellulose, in solvents such as pine oil and the monobutyl ether of ethylene glycol monoacetate. The vehicle may contain or be composed of volatile liquids to promote fast setting after application to the substrate.

The ratio of inert liquid vehicle to solids in the thick-film compositions may vary considerably, and depends upon the manner in which the dispersion is to be applied to a substrate and on the kind of vehicle used. Generally, from 0.1 to 20 parts of solids per part of vehicle, by weight, will be used to produce a dispersion of the desired consistency. Preferred dispersions contain 50–75% vehicle.

As indicated above, the compositions of the present invention are printed onto ceramic substrates, after which the printed substrate is fired to mature (sinter) the varistor compositions of the present invention, thereby forming electrically continuous patterns. Conventional sintering temperatures are employed to mature the varistor and render them electrically continuous and adherent to the substrate. Typically, temperatures in the range 750°–900°C., for at least several minutes at peak temperature, are employed.

The dielectric substrate on which thick-film varistors are printed may be any of the conventional dielectrics compatible with the compositions to be printed and the firing temperature employed, e.g., alumina, barium titanate, etc.

EXAMPLES

The following examples and comparative showings are presented to illustrate the advantages of the present invention. In the examples and elsewhere in the specification and claims, all parts, percentages, proportions, etc., are by weight, unless otherwise stated.

The doped iron oxides used in the Examples were prepared by milling together the desired proportions of reagent grade $Fe_2O_3$ and $TiO_2$ or $GeO_2$ as an aqueous slurry for 10–14 hours using 1/4-inch long zirconia cylinders as the grinding medium, then drying the blended product and firing it at 1200°C. in a Pt crucible for 18 hours. Thereafter the fired product was milled for 21 hours to produce a product having an average particle size less than 1 micron. The composition of the glasses used in the Examples is set forth in Table 1. The identity of the doped iron oxide and the relative amounts of doped iron oxide and glass are set forth in Table 2, expressed as percent of total doped iron oxide plus glass. The amount of dopant ($TiO_2$ or $GeO_2$) is indicated in terms of weight percent dopant in total $Fe_2O_3$ and dopant; also, $x$ in $Fe_{2-x}M_xO_3$ is calculated. Since it is thought that the maximum amount of dopant which can be inserted into the $Fe_2O_3$ lattice corresponds to an $x$ equal to 0.05, a calculated $x$ above 0.05 corresponds to a system containing excess unreacted dopant.

The inorganic powders used in the Examples were finely divided (passed through a 400 mesh screen). They were mixed together and dispersed in an inert liquid vehicle of 90% terpineol and 10% ethyl cellulose; the solids vehicle ratio was about 7/3.

The paste compositions were printed through a 325 mesh screen onto 96% alumina substrates.

Electrode composition is set forth in Table 2; the substrates with a varistor print were dried in air at 110°C. The printed and dried substrate was then fired at the temperature and for the time set forth in Table 2 in either a belt or box furnace as there indicated. Where a box furnace was employed, the printed sample was first plunged into a box furnace, preheated to 300°C., for 10 minutes, and then plunged into another box furnace for the time and at the temperature indicated in Table 2. Where a belt furnace was used, no 300°C. preheat was used, but the maximum temperature indicated in Table 2 was achieved for about 10 minutes of the total cycle. Where top electrode terminations were applied, using the electrode material set forth in Table 2, they were subsequently fired at 850°C. for 10 minutes.

Current (I) and voltage (V) on the fired samples were determined using a Tektronix curve tracer No. 575. I and V are reported in Table 2, as is $n$, the measure of nonlinearity which is determined in that I varies with $V^n$ where I is the current through the device, and V is the voltage across the device.

TABLE 1

INORGANIC BINDERS USED IN COMPOSITIONS OF TABLE 2

| Binder No. | Composition |
|---|---|
| A | 60% $Bi_2O_3$, 37% PbO, 5% $K_2O$ |
| B | $Bi_2O_3$ |
| C | 10% $Bi_2O_3$, 63% PbO, 26% $SiO_2$, 0.7% $Al_2O_3$ |
| D | 3% $Bi_2O_3$, 57% PbO, 18% $SiO_2$, 7% $Na_2O$, 6% $K_2O$, 6% $TiO_2$, 2% $Li_2O$, 1% $Sb_2O_3$ |
| E | 12% $Bi_2O_3$, 81% PbO, 1% $SiO_2$, 5% $PbF_2$ |
| F | 13% $Bi_2O_3$, 68% PbO, 9% CdO, 9% $SiO_2$ |
| G | 75% CdO, 20.3% $B_2O_3$, 1.3% $SiO_2$, 3.4% $Al_2O_3$ |
| H | 59.9% CdO, 15.8% $B_2O_3$, 14.3% $SiO_2$, 3.0% $Al_2O_3$ 7.0% $Na_2O$ |

TABLE 2

| Run No. | M | Wt. % $MO_2$ in $Fe_2O_3$/$MO_2$ | $Fe_2O_3/MO_2$ Calculated Value of x in $Fe_{2-x}M_xO_3$ | Wt. % $Fe_2O_3/MO_2$ in Total $Fe_2O_{3/MO2}$ Plus Glass | Binder No. | Binder Wt. % | Varistor Configuration Multilayer (M) or Coplanar (C) | Firing Conditions °C. | Firing Conditions Min. | Belt or Box Firing | Termination | I (Milliamps) | V (Volts) | n |
|---|---|---|---|---|---|---|---|---|---|---|---|---|---|---|
| 1 | Ge | 3.5 | 0.054 | 95 | A | 5 | C | 850 | 10 | Box | Ag | 0.1 | 200 | 3.8 |
| 2 | Ti | 1.0 | 0.020 | 95 | A | 5 | C | 850 | 10 | Box | Ag | 0.1 | 200 | 4.9 |
| 3 | Ti | 1.0 | 0.020 | 99 | A | 1 | M | 850 | 10 | Box | Ag | 1.4 | 10 | 4.6 |
| 4 | Ti | 1.0 | 0.020 | 95 | A | 5 | M | 850 | 10 | Box | Ag | 1.8 | 14 | 4.6 |
| 5 | Ge | 3.5 | 0.054 | 95 | B | 5 | M | 850 | 10 | Box | Ag | 0.7 | 14 | 4.6 |
| 6 | Ti | 1.0 | 0.020 | 95 | A | 5 | C | 850 | 10 | Box | Ag | 50 | 140 | 3.9 |
| 7 | Ti | 1.0 | 0.020 | 95 | C | 5 | C | 850 | 10 | Box | Ag | 70 | 190 | 2.8 |
| 8 | Ti | 1.0 | 0.020 | 95 | D | 5 | C | 850 | 10 | Box | Ag | 60 | 190 | 2.8 |
| 9 | Ti | 1.0 | 0.020 | 95 | E | 5 | C | 850 | 10 | Box | Ag | 60 | 190 | 3.0 |
| 10 | Ti | 1.0 | 0.020 | 95 | A | 5 | M | 850 | 10 | Box | Ag | 80 | 6 | 5.5 |
| 11 | Ti | 1.0 | 0.020 | 95 | A | 5 | C | 850 | 10 | Box | Au | — | — | 3.9 |
| 12 | Ti | 1.0 | 0.020 | 80 | A | 20 | C | 850 | 10 | Box | Au | — | — | 5.3 |
| 13 | Ge | 4.0 | 0.062 | 80 | C | 20 | C | (760<br>(760 | (60<br>(10 | Belt<br>Box | Ag | — | — | 3.4 |
| 14 | Ge | 4.0 | 0.062 | 80 | F | 20 | C | (760<br>(760 | (60<br>(10 | Belt<br>Box | Ag | — | — | 3.4 |
| 15 | Ge | 4.0 | 0.062 | 80 | (C<br>(G | (16<br>(4 | C | 760 | 60 | Belt | Ag | — | — | 3.4 |
| 16 | Ge | 4.0 | 0.062 | 70 | G | 30 | C | 760 | 10 | Box | Ag | — | — | 2.9 |
| 17 | Ti | 2.5 | 0.050 | 99 | A | 1 | M | 850 | 60 | Belt | Ag | N.D. | N.D. | N.D. |
| 18 | Ti | 2.5 | 0.050 | 95 | A | 5 | M | 850 | 60 | Belt | Ag | N.D. | N.D. | N.D. |
| 19 | Ti | 2.5 | 0.050 | 80 | A | 20 | M | 850 | 60 | Belt | Ag | N.D. | N.D. | N.D. |
| 20 | Ti | 2.5 | 0.050 | 80 | A | 20 | M | 850 | 60 | Belt | Ag | N.D. | N.D. | N.D. |
| 21 | Ge | 2 | 0.031 | 95 | A | 5 | C | 760 | 10 | Box | Ag | 0.025 | 340 | 5.63 |
| 22 | Ge | 2 | 0.031 | 80 | A | 20 | C | 760 | 10 | Box | Ag | 0.025 | 600 | 5.45 |
| 23 | Ge | 2 | 0.031 | 80 | A | 20 | C | 760 | 10 | Box | Ag | 0.025 | 1200 | 6.13 |
| 24 | Ge | 2 | 0.031 | 95 | A | 5 | C | 850 | 10 | Box | Ag | 0.025 | 400 | 5.52 |
| 25 | Ge | 2 | 0.031 | 80 | A | 20 | C | 850 | 10 | Box | Ag | 0.025 | 680 | 5.06 |
| 26 | Ge | 2 | 0.031 | 95 | A | 5 | M | 760 | 10 | Box | Ag | 0.025 | 42 | 5.92 |
| 27 | Ge | 2 | 0.031 | 80 | A | 20 | M | 760 | 10 | Box | Ag | 0.025 | 90 | 5.92 |
| 28 | Ge | 0.2 | 0.003 | 80 | A | 20 | M | 760 | 10 | Box | Ag | 0.025 | 320 | 4.29 |
| 29 | Ti | 2.5 | 0.050 | 60 | H | 40 | C | 850 | 10 | Box | Ag | N.D. | N.D. | N.D.* |

*Varistor action was observed.

The configuration in which the varistors were printed was either coplanar or multilayer. A coplanar varistor is one wherein two electrodes and a varistor element are printed in an "H" configuration, the varistor element being the cross-bar of the H, and there being only enough overlap between the conductors and the varistor to permit electrical continuity. In the coplanar configuration, prefired electrode terminations may be provided on the substrate prior to varistor printing, or the electrodes may be applied later after varistor application. A multilayer varistor is one wherein the substrate is provided with a prefired "bottom" electrode, over which a varistor element is printed; in turn, a top electrode is printed over the varistor element. With a given varistor composition of this invention, varistor behavior for a coplanar versus a multilayer configuration is within about 15% for each configuration. Table 2 indicates which configuration was used in each Example.

EXAMPLES 30–31

When varistors are prepared in thick-film form in the manner set forth in Examples 1–29, using the reaction product of $Fe_2O_3$ plus 8% $GeO_2$ and 8% $TiO_2$, respectively (based on total $Fe_2O_3$ and $GeO_2$ or $TiO_2$), plus 5% glass (based on total $Fe_2O_3/GeO_2$ or $TiO_2$/glass), varistor action is observed. In each case there was excess unreacted dopant ($GeO_2$ or $TiO_2$) present.

EXAMPLES 32–35

A glass not of the present invention was employed with $Fe_{2-x}Ti_xO_3$ in printing elements which were formed not to exhibit varistor action. The glass contained no PbO, $Bi_2O_3$ or CdO, but was 70% $SiO_2$ and 30% $B_2O_3$.

The semiconductive oxide of Example 17 (obtained by heating 2.5% $TiO_2$ and 97.5% $Fe_2O_3$, for a calculated $x$ of 0.050) was used to print varistor elements using the same conditions as those of Example 17. The amount of glass was 10% in Example 32, 20% in Example 33, 40% in Example 34, and 60% in Example 35, based on total weight of $Fe_2O_3/TiO_2$/ glass. The n ranged from 2.0 to 1.8, but varistor action was not observed.

X-ray patterns obtained on the $Fe_{2-x}Ti_xO_3$ used in this work showed it to have a similar X-ray pattern to that reported above for $Fe_{2-x}Ge_xO_3$; hence, the same crystalline structure was present.

When in the present invention reference is made to excess or unreacted or free $GeO_2$ or $TiO_2$, we mean $GeO_2$ or $TiO_2$ which has not reacted with $Fe_2O_3$ to form the semiconductive oxide $Fe_{2-x}M_xO_3$; no position is taken as to whether other reaction products have formed with that excess $GeO_2$ or $TiO_2$ during firing.

We claim:

1. A composition useful for printing a film on a dielectric substrate and firing the same to form film varistors, said composition being of finely divided inorganic material dispersed in an inert liquid vehicle, said inorganic material comprising, by weight, a. 60–99% of a crystalline semiconductive oxide of the formula $Fe_{2-x}M_xO_3$, wherein M is one or more of Ge and Ti and $x$ is in the range 0.0001–0.05, and b. 1–40% of a glass powder comprising one or more of at least 10% PbO, at least 10% $Bi_2O_3$ and at least 25% CdO.

2. Compositions according to claim 1 where M is Ge.

3. Compositions according to claim 1 where M is Ti.

4. Compositions according to claim 1 comprising 70–95% (a) and 5–30% (b).

5. Compositions according to claim 2 comprising 70–95% (a) and 5–30% (b).

6. Compositions according to claim 3 comprising 70–95% (a) and 5–30% (b).

7. Compositions according to claim 1 comprising 80–95% (a) and 5–20% (b).

8. Compositions according to claim 2 comprising 80–95% (a) and 5–20% (b).

9. Compositions according to claim 3 comprising 80–95% (a) and 5–20% (b).

10. Compositions according to claim 1 comprising at least one additional free unreacted oxide selected from the class consisting of $TiO_2$ and $GeO_2$, wherein the total amount of $TiO_2$ and/or $GeO_2$ present in both the semiconductive oxide $Fe_{2-x}M_xO_3$ and as free oxide is up to about 10% by weight of the total weight of semiconductive oxide and such free oxide present.

11. Compositions according to claim 2 comprising free $GeO_2$ wherein the total $GeO_2$ present in both the semiconductive oxide and as free oxide is up to about 10% by weight of the total weight of semiconductive oxide and free $GeO_2$ present.

12. Compositions according to claim 3 comprising free $TiO_2$ wherein the total $TiO_2$ present in both the semiconductive oxide and as free oxide is up to about 10% by weight of the total weight of semiconductive oxide and free $TiO_2$ present.

13. Compositions according to claim 4 comprising at least on additional free unreacted oxide selected from the class consisting of $TiO_2$ and $GeO_2$, wherein the total amount of $TiO_2$ and/or $GeO_2$ present in both the semiconductive oxide $Fe_{2-x}M_xO_3$ and as free oxide is up to about 10% by weight of the total weight of semiconductive oxide and such free oxide present.

14. Compositions according to claim 7 comprising at least one additional free unreacted oxide selected from the class consisting of $TiO_2$ and $GeO_2$, wherein the total amount of $TiO_2$ and/or $GeO_2$ present in both the semiconductive oxide $Fe_{2-x}M_xO_3$ and as free oxide is up to about 10% by weight of the total weight of semiconductive oxide and such free oxide present.

15. Compositions according to claim 1 wherein glass powder (b) comprises at least 40% of one or more of PbO, $Bi_2O_3$ and CdO.

16. Compositions according to claim 2 wherein glass powder (b) comprises at least 40% of one or more of PbO, $Bi_2O_3$ and CdO.

17. Compositions according to claim 3 wherein glass powder (b) comprises at least 40% of one or more of PbO, $Bi_2O_3$ and CdO.

18. Film varistors on a dielectric substrate of the inorganic material of claim 1.

19. Film varistors on a dielectric substrate of the inorganic material of claim 2.

20. Film varistors on a dielectric substrate of the inorganic material of claim 3.

21. Film varistors on a dielectric substrate of the inorganic material of claim 4.

22. Film varistors on a dielectric substrate of the inorganic material of claim 7.

23. Film varistors on a dielectric substrate of the inorganic material of claim 8.

24. Film varistors on a dielectric substrate of the inorganic material of claim 9.

25. Film varistors on a dielectric substrate of the inorganic material of claim 10.

26. Film varistors on a dielectric substrate of the inorganic material of claim 11.

27. Film varistors on a dielectric substrate of the inorganic material of claim 12.

28. Film varistors on a dielectric substrate of the inorganic material of claim 13.

29. Film varistors on a dielectric substrate of the inorganic material of claim 14.

30. Film varistors on a dielectric substrate of the inorganic material of claim 15.

* * * * *